US012706695B2

(12) United States Patent
Gudumasu et al.

(10) Patent No.: US 12,706,695 B2
(45) Date of Patent: Aug. 11, 2026

(54) REPORTING OF ACTIVELY DISCARD PACKETS INFORMATION FOR APPLICATION-LAYER FORWARD ERROR CORRECTION IN 5G SERVICES

(71) Applicant: InterDigital VC Holdings, Inc., Wilmington, DE (US)

(72) Inventors: Srinivas Gudumasu, Montreal (CA); Ahmed Hamza, Coquitlam (CA)

(73) Assignee: InterDigital VC Holdings, Inc., Wilmington, DE (US)

( * ) Notice: Subject to any disclaimer, the term of this patent is extended or adjusted under 35 U.S.C. 154(b) by 53 days.

(21) Appl. No.: 18/800,941

(22) Filed: Aug. 12, 2024

(65) Prior Publication Data

US 2026/0046066 A1 Feb. 12, 2026

(51) Int. Cl.

| | |
|---|---|
| ***H04L 1/08*** | (2006.01) |
| ***H04L 47/32*** | (2022.01) |
| ***H04L 65/65*** | (2022.01) |
| ***H04L 65/70*** | (2022.01) |

(52) U.S. Cl.

CPC ................ *H04L 1/08* (2013.01); *H04L 47/32* (2013.01); *H04L 65/65* (2022.05); *H04L 65/70* (2022.05)

(58) Field of Classification Search

CPC . H04L 1/08; H04L 65/70; H04L 65/65; H04L 47/32

See application file for complete search history.

(56) References Cited

U.S. PATENT DOCUMENTS 8,316,268 B2 * 11/2012 Fukuoka ............... H04L 1/1825 714/776
2007/0124626 A1 * 5/2007 Lee ....................... H04L 1/0057 714/704
2009/0129276 A1 5/2009 Dendy
2011/0222403 A1 * 9/2011 Suh ......................... H04L 47/24 370/231
2021/0336725 A1 10/2021 Zhou

OTHER PUBLICATIONS

International Search Report and Written Opinion of the International Searching Authority for PCT/US2025/041148 mailed Nov. 11, 2025 (13 pages).
Lemovo., "Views on SA2 LS on AL-FEC awareness", TSG SA4 WG #128 meeting, May 2024, Jeju Island, Republic of Korea, Tdoc S4-241088 (4 pages).
European Telecommunications Standards Institute (ETSI TR) Technical Report LTE; 5G; Traffic Models and Quality Evaluation Methods for Media and XR Services in 5G Systems (3GPP TR 26.926 version 18.2.0 Release 18, May 2024 (88 pages).

(Continued)

*Primary Examiner* — Nazia Naoreen

(74) *Attorney, Agent, or Firm* — Klintworth & Rozenblat LLP

(57) ABSTRACT

A method according to one embodiment comprises sending a first plurality of packets using forward error correction, FEC, with an initial success ratio. A report is received regarding a number of packets in the first plurality that were not delivered because they were actively discarded or considered obsolete. An updated success ratio is selected based at least in part on the report. A second plurality of packets is then sent using FEC with the updated success ratio.

22 Claims, 12 Drawing Sheets

(56) References Cited

OTHER PUBLICATIONS

European Telecommunications Standards Institute (ETSI TR) Technical Report 5G; Extended Reality (XR) in 5G (3GPP TR 26.928 version 18.0.0 Release 18, May 2024 (133 pages).
Schulzrinne, H. et al., "RTP: A transport protocol for real-time applications" No. rfc3550. Jul. 2003 (104 pages).
Friedman, T., et al., "RTP: Control Protocol Extended Reports (RTCP XR)" No. rfc3611. Nov. 2003 (55 pages).
Ott, J., et al., "Extended RTP Profile for Real-time Transport Control Protocol (RTCP)—Based Feedback (RTP/AVPF)" No. rfc4585. Jul. 2006 (51 pages).
Luby, M. et al., "Raptor Forward Error Correction Scheme for Object Delivery Status of This Memo" No. rfc5053. Oct. 2007 (46 pages).
Luby, M. et al., "RaptorQ Forward Error Correction Scheme for Object Delivery Abstract" No. rfc6330. Aug. 2011 (69 pages).
Lacan, J. et al., "Reed-Solomon Forward Error Correction (FEC) Schemes Status of This Memo" No. rfc5510. Apr. 2009 (28 pages).
Roca, V. et al., "Simple Reed-Solomon Forward Error Correction (FEC) Scheme for FECFRAME Abstract" No. rfc6865. Feb. 2013 (23 pages).
Third Generation Partnership Project, "3rd Generation Partnership Project; Technical Specification Group Services and System Aspects; Study on architecture enhancement for Extended Reality and Media service (XRM); Phase 2 (Release 19)" 3GPP TR 23.700-70 V1.0.0, Jun. 2024 (145 pages).
Third Generation Partnership Project, "3rd Generation Partnership Project; Technical Specification Group Services and System Aspects; Study on 5G Real-time Transport Protocol Configurations, Phase 2 (Release 19)" 3GPP TR 26.822 V0.1.0, May 2024 (42 pages).
Third Generation Partnership Project, "3rd Generation Partnership Project; Technical Specification Group Services and System Aspects Split Rendering Media Service Enabler; (Release 18)" 3GPP TS 26.565 V18.0.0, Jun. 2024 (55 pages).
Third Generation Partnership Project, "3rd Generation Partnership Project; Technical Specification Group Services and System Aspects; 5G Real-time Media Transport Protocol Configurations (Release 18)" 3GPP TS 26.522 V18.1.0, Jun. 2024 (34 pages).
Third Generation Partnership Project, "3rd Generation Partnership Project; Technical Specification Group Services and System Aspects; Media delivery; interactions and APIs for provisioning and media session handling; (Release 18)" 3GPP TS 26.510 V18.0.0, Jun. 2024 (156 pages).
Singer, D. et al., "A General Mechanism for RTP Header Extensions Abstract" No. rfc8285. Oct. 2017 (25 pages).
Third Generation Partnership Project, "3rd Generation Partnership Project; Technical Specification Group Services and System Aspects; Real-Time Media Communication; Protocols and APIs (Release 18)" 3GPP TS 26.113 V18.0.0, Jun. 2024 (46 pages).

* cited by examiner

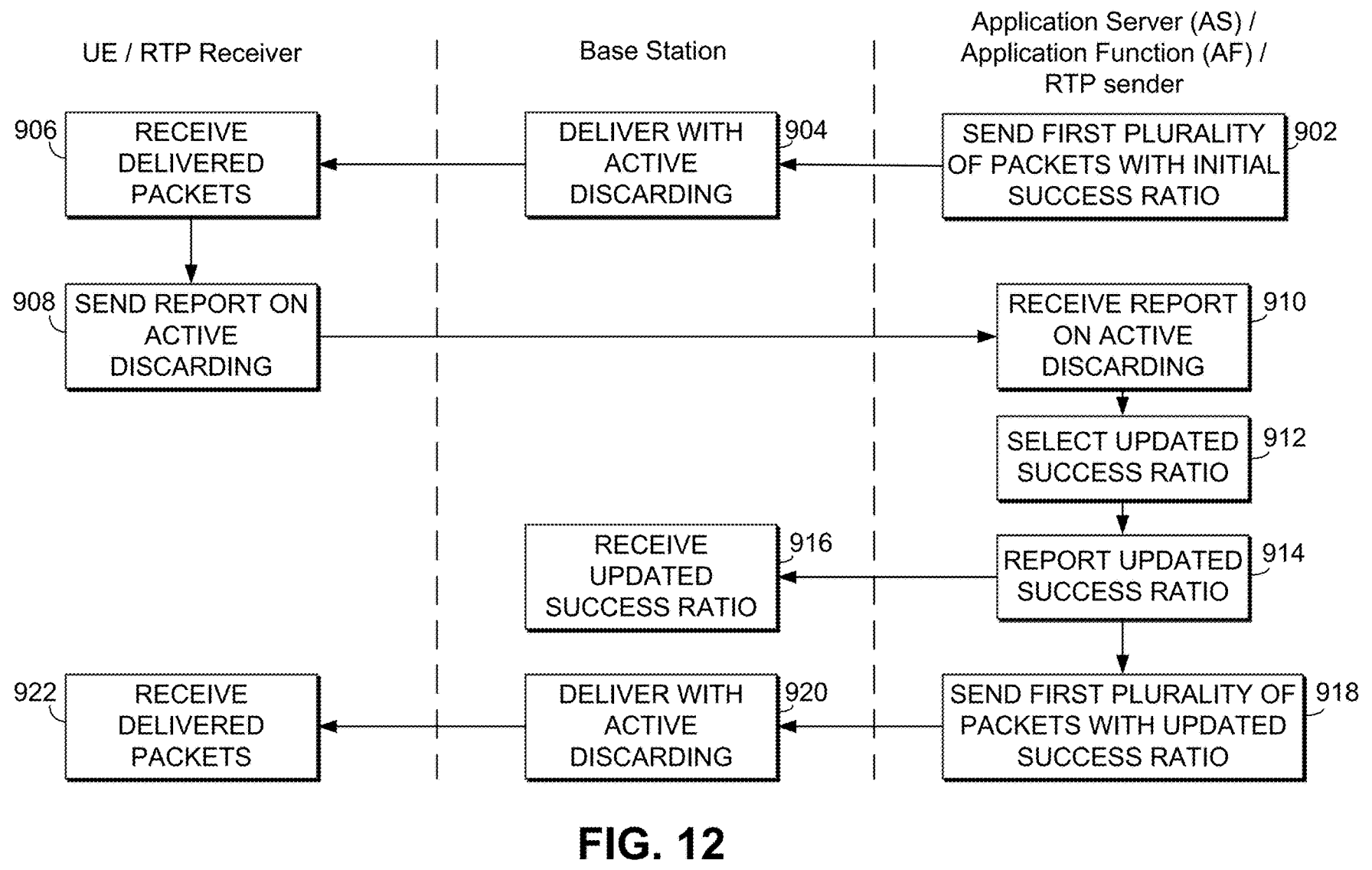

Application Server (AS) / Application Function (AF) / RTP sender

Base Station

UE / RTP Receiver

902 SEND FIRST PLURALITY OF PACKETS WITH INITIAL SUCCESS RATIO

904 DELIVER WITH ACTIVE DISCARDING

906 RECEIVE DELIVERED PACKETS

908 SEND REPORT ON ACTIVE DISCARDING

910 RECEIVE REPORT ON ACTIVE DISCARDING

912 SELECT UPDATED SUCCESS RATIO

914 REPORT UPDATED SUCCESS RATIO

916 RECEIVE UPDATED SUCCESS RATIO

918 SEND FIRST PLURALITY OF PACKETS WITH UPDATED SUCCESS RATIO

920 DELIVER WITH ACTIVE DISCARDING

922 RECEIVE DELIVERED PACKETS

FIG. 12

REPORTING OF ACTIVELY DISCARD PACKETS INFORMATION FOR APPLICATION-LAYER FORWARD ERROR CORRECTION IN 5G SERVICES

BACKGROUND

The present application is related to Commercial XR split rendering and cloud gaming services. Such services use Application Layer Forward Error Correction (AL-FEC), as documented in clause 5.7.4 of TR 26.926 v18.1.0: "Traffic Models and Quality Evaluation Methods for Media and XR Services in 5G Systems". That clause also illustrates the principles underpinning the use of AL-FEC by XR applications, as follows:

- Applications send Application Data Units (ADUs) consisting of source symbols, which contain for instance a video frame, and in addition repair symbols.
- If the code that is used is maximum distance separable (MDS), e.g., in case of Raptor codes defined in IETF RFC 5053, RaptorQ codes defined in IETF RFC 6330, or Reed-Solomon codes defined in IETF RFC 5510 and IETF RFC 6865, then the source and repair symbols are distributed across N packets such that the receiver can reconstruct the actual content (e.g. the video frame) if any K out of N packets (with K<N) are received.

In other words, from receiver perspective, it is sufficient to receive K packets of the ADU to be able to reconstruct the actual content. This also implies that once the receiver has successfully received K out of the N packets that the ADU consists of, transmitting the remaining N-K packets of the ADU to the receiver does not add any value because the receiver can already reconstruct the original content based on the first K packets. Various MDS-based and non-MDS-based FEC schemes used in the industry for commercial deployments are described in TR 26.822 v0.1.0: "Study on 5G Real-time Transport Protocol Configurations, Phase 2."

AL-FEC codecs are used in ensuring low latency media delivery for networks with bursty losses and RTT delays comparable to or higher than the jitter buffer delay constraints of an application. AL-FEC is not an exclusive packet loss mechanism and may be used interchangeably with retransmissions. AL-FEC encoding is in fact utilized in practice in supplement to RTCP NACK indication and the AL-FEC redundancy level is usually dynamically adapted to network conditions.

An advantage of AL-FEC over other schemes is that error recovery is proactively protected by redundant packets and a decoder may be able to recover from any packet losses without any additional transport-related delays (e.g., as for retransmissions-based mechanisms). However, the cost to pay for using AL-FEC is additional bandwidth utilization. A dynamic AL-FEC controller assists in providing a good trade-off between AL-FEC bandwidth utilization and QoS is achieved by balancing the bandwidth split between the source media content and the AL-FEC redundancy added. FIG. 1 illustrates potential operation points for an AL-FEC encoded media stream (e.g., a video stream) as adapted by a dynamic AL-FEC controller based on network conditions. Operation point (1) illustrates an unprotected media stream at 30 Mbps, operation point (2) illustrates an AL-FEC protected media stream with a high AL-FEC redundancy rate of 100% (i.e., equal bandwidth split between media and repair packets), and operation point (3) illustrates an AL-FEC protected media stream with a low AL-FEC redundancy rate of 25%.

The network metrics and statistics that influence the operation of AL-FEC controller are usually diverse and may involve available bandwidth estimation/information, packet loss statistics, packet loss feedback, and RTT delay estimation/information, among other factors.

Congestion events thus affect the operation of the AL-FEC dynamic behavior. At a high-level in low packet loss conditions, the AL-FEC redundancy rate is reduced considerably (e.g., operation point (3) in FIG. 1), or even eliminated (e.g., operation point (1) in FIG. 1) as per application configuration and preferences. On the other hand, for some higher packet loss values, given that the link has the necessary bandwidth, the AL-FEC redundancy rate may be increased to provide more redundancy and protection against network losses. However, in case congestion events persist and available bandwidth degrades, the AL-FEC redundancy rate is usually backed-off and the media source rate is adapted to a lower source rate to account for the lower bandwidth available.

The high-level control loop detailed above entails frequent network conditions monitoring (e.g., every second) and corresponding reactive AL-FEC redundancy rate and media source rate adaptation. This achieves an elastic and robust transport mechanism for low latency media delivery even over bursty lossy networks.

The concept of active discarding is discussed in TS 23.700-70, Study on architecture enhancement for Extended Reality and Media service (XRM); Phase 2; (Release 19), V1.0.0. Active discarding applies to downlink data and is an operation that is performed on a data flow by the base station. The data flow may be a QoS Flow. To perform active discarding, the base station may receive configuration information for the flow. The configuration information may be part of the QoS Profile. The configuration may indicate that active discarding may be performed in the QoS Flow and the configuration may indicate a success ratio. The success ratio indicates the ratio of PDUs of a PDU Set that the UE needs in order to recover the transmitted media successfully to the number of PDUs present in that PDU Set which includes both the source media and the AL-FEC redundant media. For example, if the success ratio is 2-to-3 and there are 12 PDUs in the PDU Set, then the base station may know that the UE needs to receive 8 PDUs of the set in order to recover the transmitted media in the PDU Set. The success ratio setting may be based on the AL-FEC code rate. Once enough PDUs of the PDU Set have been delivered to the UE for the UE to recover the transmitted media in the PDU Set, the remaining PDUs of the PDU Set may be considered obsolete PDUs. The success ratio may be static, or dynamic based on the network conditions, receiver statistics and application configuration.

Active discarding is the act of the base station determining to not send one or more PDUs of a PDU Set to the UE because the base station has detected that enough PDUs of the PDU Set have already been delivered to the UE to meet the success ratio. In other words, enough PDUs of the PDU Set have already been delivered to the UE for the UE to recover the transmitted media. If the base station discards obsolete PDUs, then the application in the UE may observe that the UE constantly receives just enough PDUs to be able to reconstruct the original content.

Hereinafter, the term active discarding and the AL-FEC obsolete PDUs discarding is used interchangeably in this document.

There are a number of possible ways to carry a variety of control information using RTCP packets. This includes:

Profile-specific extensions to the sender (PT=200) and receiver report (PT=201), as described in RFC 3550, "RTP: A Transport Protocol for Real-Time Applications."

Application-defined RTCP packet with payload type equal to 204 (PT=204), as described in RFC 3550.

Extended reports (XR) with payload type equal to 207 (PT=207), as described in RFC 3611, "RTP Control Protocol Extended Reports (RTCP XR)."

Generic RTP Feedback reports with payload type equal to 205 (RTPFB; PT=205), as described in RFC 4585, "Extended RTP Profile for Real-time Transport Control Protocol (RTCP)-Based Feedback (RTP/AVPF)."

Payload-specific RTCP feedback messages with payload type equal to 206 (PSFB; PT=206), as described in RFC 4585.

The RTCP XR packet format is as shown in FIG. 2 and described in RFC 3611.

An XR packet consists of a header of two 32-bit words, followed by a number, possibly zero, of extended report blocks. This type of packet is laid out in a manner consistent with other RTCP packets, as concerns the essential version, packet type, and length information.

version (V) [2 bits]. Identifies the version of RTP. This specification applies to RTP version two.

padding (P) [1 bit]. If the padding bit is set, this XR packet contains some additional padding octets at the end. The semantics of this field are identical to the semantics of the padding field in the SR packet, as defined by the RTP specification RFC 3550.

reserved [5 bits]. This field is reserved for future definition. In the absence of such definition, the bits in this field is set to zero and is ignored by the receiver.

packet type (PT) [8 bits]. Contains the constant 207 to identify this as an RTCP XR packet. This value is registered with the Internet Assigned Numbers Authority (IANA).

length [16 bits]. The length of this XR packet in 32-bit words minus one, including the header and any padding.

SSRC [32 bits]. The synchronization source identifier for the originator of this XR packet.

report blocks [variable length]. Zero or more extended report blocks. In keeping with the extended report block framework defined below, each block consists of one or more 32-bit words.

Extended report blocks are stacked, one after the other, at the end of an XR packet. The value of BT (block type) field identifies the block format, and its name space is managed by IANA. An individual block's length is a multiple of 4 octets. The XR header's length field describes the total length of the packet, including these extended report blocks. Each block has block type and length fields that facilitate parsing. A receiving application can demultiplex the blocks based upon their type and can use the length information to locate each successive block, even in the presence of block types it does not recognize.

IETF RFC 3611 defines seven extended report blocks: block types for reporting upon received packet losses and duplicates, packet reception times, receiver reference time information, receiver inter-report delays, detailed reception statistics, and voice over IP (VOIP) metrics.

An extended report block has format as illustrated in FIG. 3. The semantics for that format are as follows.

block type (BT) [8 bits] Identifies the block format. Seven block types are defined in Section 4 of RFC3611. Additional block types may be defined in future specifications. This field's name space is managed by the Internet Assigned Numbers Authority (IANA).

type-specific [8 bits]. The use of these bits is determined by the block type definition.

Block length [16 bits]. The length of this report block, including the header, in 32-bit words minus one. If the block type definition permits, zero is an acceptable value, signifying a block that consists of only the BT, type-specific, and block length fields, with a null type-specific block contents field.

type-specific block contents [variable length]. The use of this field is defined by the particular block type, subject to the constraint that it is a multiple of 32 bits long. If the block type definition permits, It may be zero bits long.

When initiating multimedia teleconferences, voice-over-IP calls, streaming video, or other sessions, it is desirable to convey media details, transport addresses, and other session description metadata to the participants. SDP provides a standard representation for such information, irrespective of how that information is transported. SDP is purely a format for session description; it does not incorporate a transport protocol, and it is intended to use different transport protocols as appropriate, including the Session Announcement Protocol, Session Initiation Protocol, Real Time Streaming Protocol, and the Hypertext Transport Protocol.

An SDP session description includes the following:

Session name and purpose

Time(s) the session is active

The media comprising the session

Information needed to receive those media (addresses, ports, formats, etc.)

As resources necessary to participate in a session may be limited, some additional information may also be desirable:

Information about the bandwidth to be used by the session

Contact information for the person responsible for the session

In general, SDP operates to convey sufficient information to enable applications to join a session (with the possible exception of encryption keys) and to announce the resources to be used to any non-participants that may need to know.

Session Description Protocol (SDP) signaling for XR blocks can be employed by applications that utilize SDP. This signaling is defined to be used either by applications that implement the SDP Offer/Answer model or by applications that use SDP to describe media and transport configurations in connection with such protocols as the Session Announcement Protocol (SAP) or the Real Time Streaming Protocol (RTSP). There may exist other potential signaling methods that are not described here.

The XR blocks may be used without prior signaling. This is consistent with the rules governing other RTCP packet types, as described in RFC 3550. An example in which signaling would not be used is an application that always uses one or more XR blocks. However, for applications that are configured at session initiation, the use of some type of signaling is recommended. Note that, although the use of SDP signaling for XR blocks may be optional. If SDP signaling is used in an environment where XR blocks are only implemented by some fraction of the participants, the ones not implementing the XR blocks will ignore the SDP attribute.

Real-time media streams that use RTP are, to some degree, resilient against packet losses. Receivers may use the base mechanisms of the Real-time Transport Control Protocol (RTCP) to report packet reception statistics and thus allow a sender to adapt its transmission behavior in the mid-term. This may be used as the sole means for feedback and feedback-based error repair (besides a few codec-specific mechanisms). The IETF RFC 4585 defines an extension to the Audio-visual Profile (AVP) that enables receivers to provide, statistically, more immediate feedback to the senders and thus allows for short-term adaptation and efficient feedback-based repair mechanisms to be implemented.

A payload format-specific SDP attribute may be used to indicate the capability of using RTCP feedback as defined in RFC 4585: "a=rtcp-fb". The "rtcp-fb" attribute is used as an SDP media attribute and is not provided at the session level. The "rtcp-fb" attribute may be used in media sessions for which the "AVPF" is specified. The "rtcp-fb" attribute should be used to indicate which RTCP FB messages may be used in a media session for the indicated payload type. A wildcard payload type ("*") may be used to indicate that the RTCP feedback attribute applies to all payload types. If several types of feedback are supported and/or the same feedback shall be specified for a subset of the payload types, several "a=rtcp-fb" lines may be used.

Payload-specific feedback messages transport information that is specific to a certain payload type and will be generated and acted upon at the codec layer. The packet format of an RTCP Feedback Message is illustrated in FIG. 4.

The PT (payload type) field identifies the packet as being an RTCP FB message. Currently two values are defined by the IANA: PT-205 for RTPFB (transport layer FB message) and PT=206 for PSFB (payload-specific FB message). The FMT (feedback message type) field identifies the type of FB message and is interpreted relative to the payload type (i.e., RTPFB or PSFB). The FMT values for both the RTPFB payload type and the PSBF payload type are managed by IANA.

Application-Defined RTCP Packet. The APP packet is intended for experimental use as new applications and new features are developed, without requiring packet type value registration. APP packets with unrecognized names may be ignored. After testing and if wider use is justified, each APP packet may be redefined without the subtype and name fields and registered with IANA using an RTCP packet type. The format of an Application-defined RTCP packet is illustrated in FIG. 5.

The semantics of the APP packets are as follows, version (V) [2 bits]. Identifies the version of RTP, which is the same in RTCP packets as in RTP data packets. The version defined by this specification is two (2).

padding (P) [1 bit]. If the padding bit is set, this individual RTCP packet contains some additional padding octets at the end which are not part of the control information but are included in the length field, as described in clause 6.4.1 in RFC 3550 length [16 bits]. The length of this RTCP packet in 32-bit words minus one, including the header and any padding. (The offset of one makes zero a valid length and avoids a possible infinite loop in scanning a compound RTCP packet, while counting 32-bit words avoids a validity check for a multiple of 4.)

subtype [5 bits]. May be used as a subtype to allow a set of APP packets to be defined under one unique name, or for any application-dependent data.

packet type (PT) [8 bits]. Contains the constant 204 to identify this as an RTCP APP packet.

name [4 octets]. A name chosen by the person defining the set of APP packets to be unique with respect to other APP packets this application might receive. The application creator might choose to use the application name, and then coordinate the allocation of subtype values to others who want to define new packet types for the application. Alternatively, it is recommended that others choose a name based on the entity they represent, then coordinate the use of the name within that entity. The name is interpreted as a sequence of four ASCII characters, with uppercase and lowercase characters treated as distinct.

application-dependent data [variable length]. Application-dependent data may or may not appear in an APP packet. It is interpreted by the application and not RTP itself. It is a multiple of 32 bits long.

SUMMARY

Briefly stated, in one embodiment, a method comprises: sending a first plurality of packets using forward error correction, FEC, with an initial success ratio; receiving a report regarding a number of packets in the first plurality that were not delivered because they were actively discarded or considered obsolete; selecting an updated success ratio based at least in part on the report; and sending a second plurality of packets using FEC with the updated success ratio.

An apparatus according to some embodiments comprises one or more processors configured to perform at least: sending a first plurality of packets using forward error correction, FEC, with an initial success ratio; receiving a report regarding a number of packets in the first plurality that were not delivered because they were actively discarded or considered obsolete; selecting an updated success ratio based at least in part on the report; and sending a second plurality of packets using FEC with the updated success ratio.

In some embodiments, the report is received from a user equipment, UE.

In some embodiments, the report is received in a real-time transport control protocol, RTCP, message.

In some embodiments, the report is received in a real-time transport control protocol extended reports, RTCP XR, message.

In some embodiments, the report is received in a real-time transport control protocol feedback, RTCPFB, message.

In some embodiments, the report includes a Boolean trace, or a run-length encoded Boolean trace, identifying packets that were actively discarded or considered obsolete.

In some embodiments, a selected fraction of the packets are excluded from the Boolean trace according to a thinning mechanism.

Some embodiments further comprise signaling the updated success ratio in a data plane, such as in a one-byte or two-byte real-time transport protocol header extension format.

Some embodiments further comprise signaling the updated success ratio in a control plane, such as in a packet data unit set marking real-time transport protocol header extension.

BRIEF DESCRIPTION OF THE DRAWINGS

FIG. 12 is a call flow diagram of a method according to one or more embodiments of the present disclosure.

DETAILED DESCRIPTION

Figure 1:
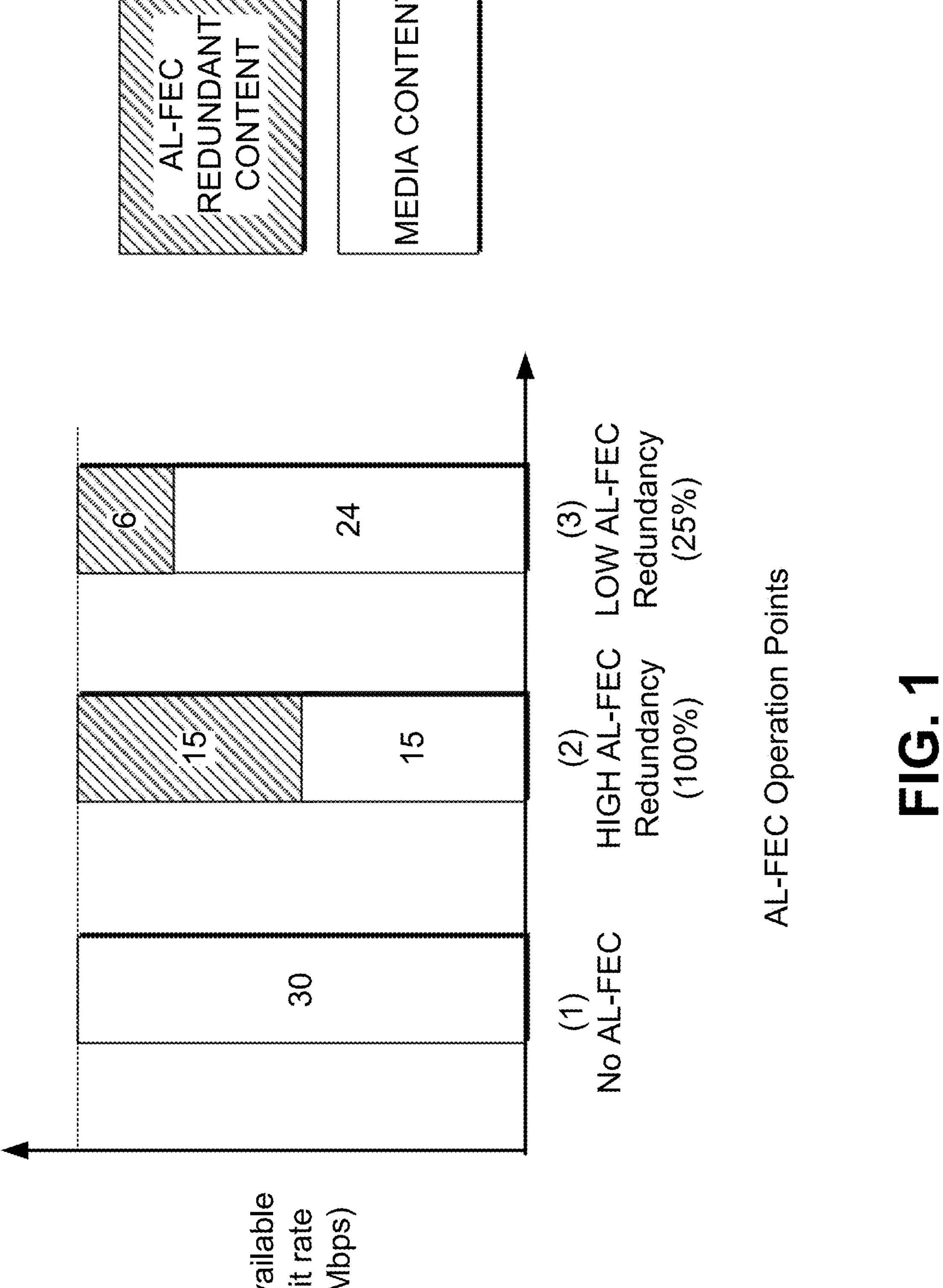
FIG. 1 is a graph illustrating example operation points of AL-FEC encoded media.
Figures 2, 3:
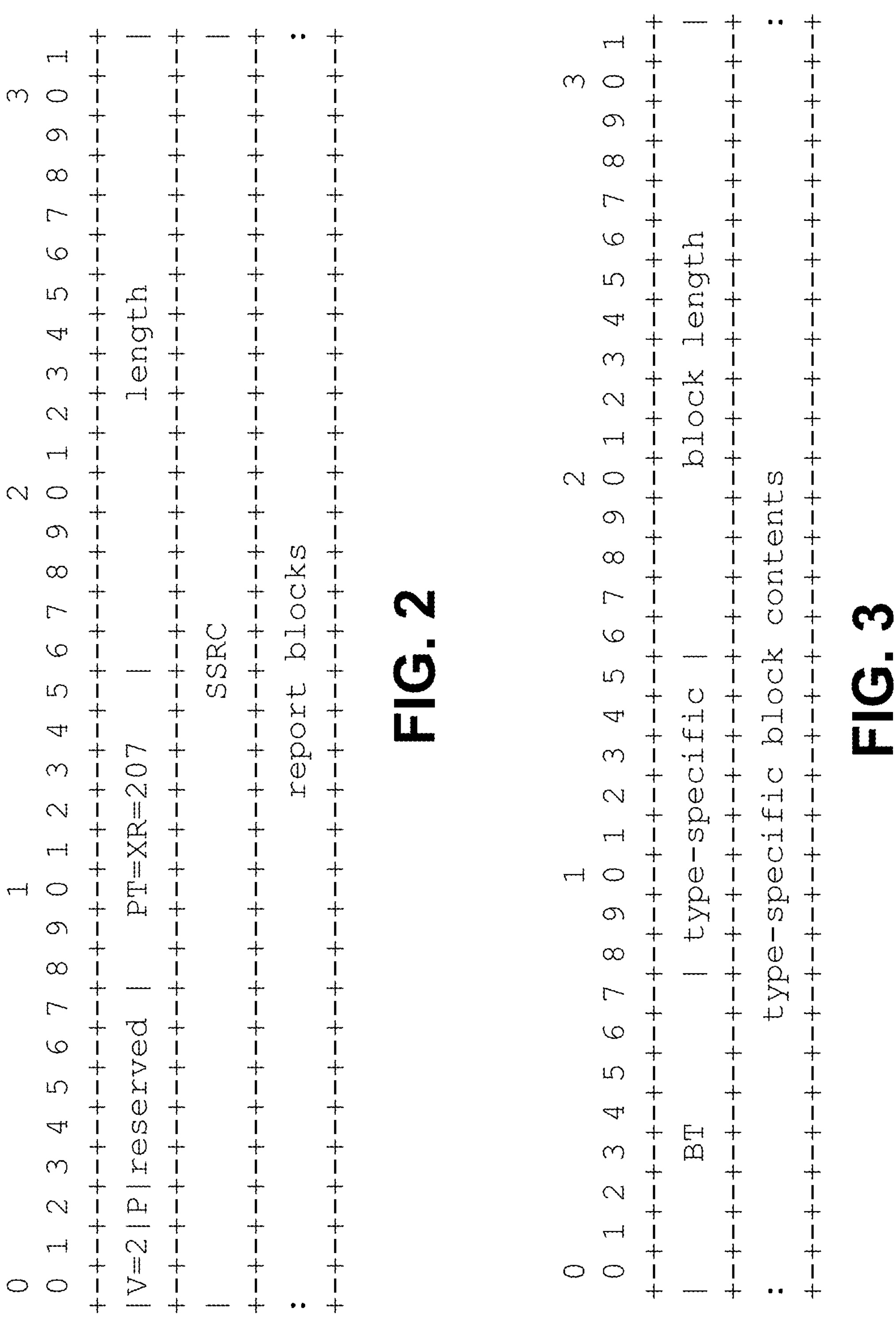
FIG. 2 illustrates an RTCP XR packet format as described in RFC 3611.
FIG. 3 illustrates an extended report block format as described in RFC 3611.
Figures 4, 5:
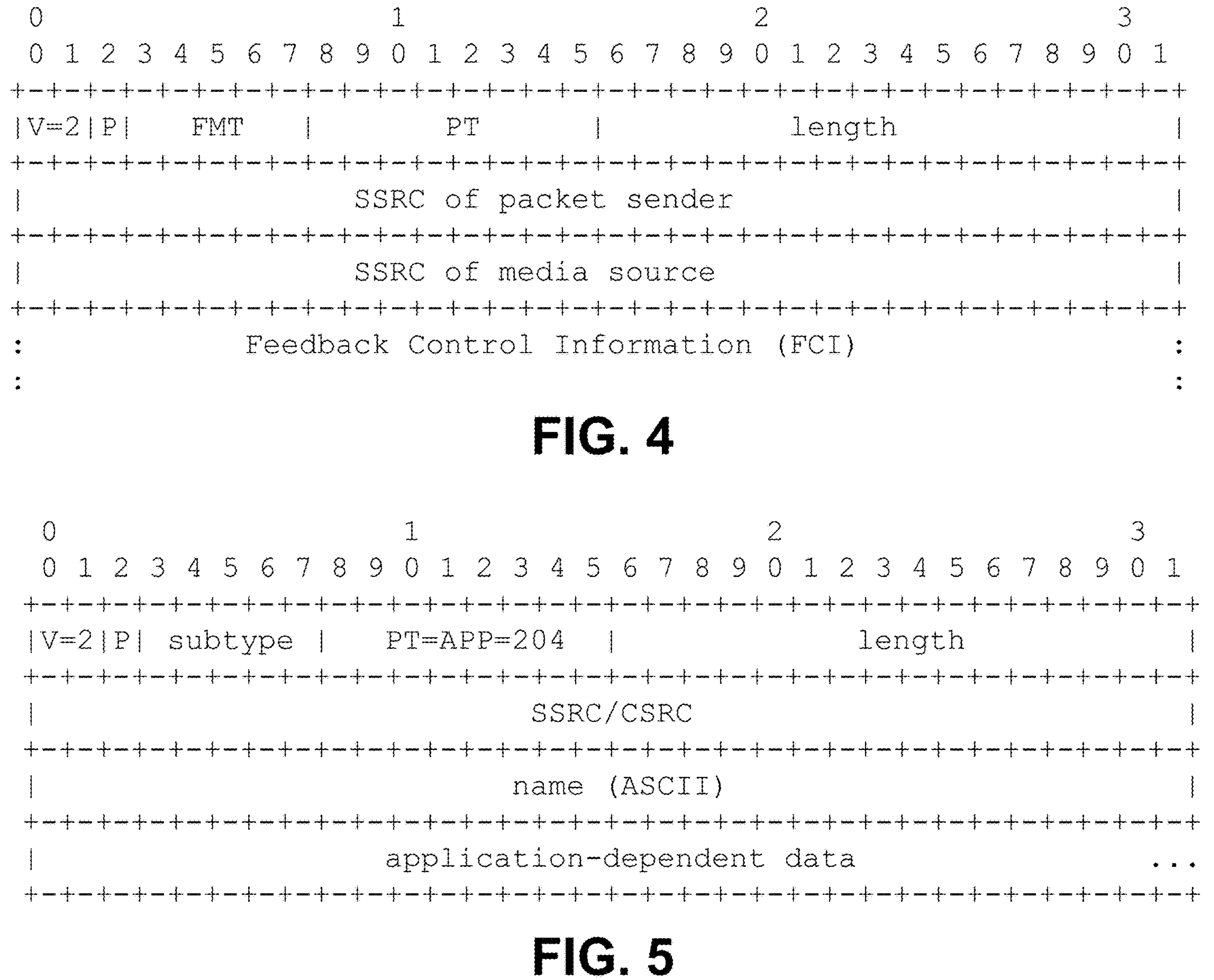
FIG. 4 illustrates an RTCP feedback message format as described in RFC 4585.
FIG. 5 illustrates an application-defined RTCP packet format as described in RFC 3550.

When active discarding is applied, the base station will intentionally drop packets under the assumption that the PDUs are not needed by the UE. However, the UE cannot distinguish between packets that are lost due to active discarding and packets that are lost due to other issues. Examples of other issues are packets that are discarded in the network (e.g., the 5G system and the Internet) due to congestion. All packets that are not received by the UE are considered "lost packets" to the UE.

Packets that are lost due to active discarding will be reported in a Loss RLE Report Block as a lost packet. However, assuming that the base station always achieves the success ratio, the Post-repair Loss RLE report would report that no packets are lost after loss-repair methods (e.g., AL-FEC) were applied. In this scenario, the reports would indicate to the application server that a number of packets were lost in the network but there were no lost packets after loss-repair methods were applied. The application server would not be able to distinguish between packets that were lost due to active discarding and packets that were lost in the network due to network limitations (e.g. congestion). Therefore, upon receiving a report that indicates that a relatively high number of packets were lost before loss-repair method were applied, the application server would not know whether and what application layer configurations need to be adjusted.

In a first issue addressed by some embodiments, to avoid such ambiguity on the lost packets reporting, it would be desirable for a UE to report the number of actively discarded packets and the number of packets lost due to congestion and other scenarios separately. This disclosure proposes methods to report the number of active discarded RTP packets information from a UE or RTP receiver to an Application Server (AS), Application Function (AF) or RTP sender.

In a second issue addressed by some embodiments, when the application layer FEC mechanisms are used, it may be desirable for a media application server to provide the AL-FEC success ratio information to the UE and 5GS components over the data plane so that the base station may discard the obsolete PDUs in a PDU set. It may also be desirable for a media application function to signal the AL-FEC success ratio value in the configuration information and signal the presence of dynamically changing AL-FEC success ratio value in PDU sets as a control plane signaling. This disclosure proposes methods to signal the dynamically changing AL-FEC success ratio information in the data plane. This disclosure also provides methods to signal whether the AL-FEC success ratio information is static or dynamic, the presence of AL-FEC success ratio information in an RTP HE, and the AL-FEC success ratio information if it is static during an RTC session or application flow in the control plane.

This disclosure describes example systems and methods to report the actively discarded packets by the network. The report notifies the application server about which packets were actively discarded so that the application server does not mistakenly determine that the packets were lost due to network performance issue and will not make application layer adjustments that will not improve performance. In some embodiments, when the UE or RTP receiver detects some packets were actively discarded with the help of RAN then the UE reports the actively discarded packets information to the application server or application function.

Some embodiments of the present disclosure also provide systems and methods to signal the dynamically changing AL-FEC success ratio information in data plane. This disclosure also provides methods to signal whether the AL-FEC success ratio information is static or dynamic, and the AL-FEC success ratio information if it is static in an RTC session or an application flow using the control plane.

RTCP Messages for Reporting Actively Discard Packets Information

In an example embodiment, the information of the AL-FEC obsolete PDUs that are discarded at the base station is signaled to the UE by the base station. These active discarded packets information at the UE or any RTP receiving entity may be reported to the AF, AS or any RTP sender using the below listed methods such as, for example, reporting using RTCP extended Report (XR) packets, or reporting using the RTCP feedback messages.

In an embodiment, the active discarded RTP packets information may be reported to the media application function (AF) or media application server (AS) from a UE or an RTP receiver using RTCP messages by extending the RTCP Extended Report (XR) framework mechanism as described in IETF RFC 3611.

In another embodiment, information on the actively discarded RTP packets may be reported by extending the RTCP feedback messages with a payload type equal to "transport layer feedback message (RTPFB)" (205) defined in IETF RFC 4585.

In another embodiment, information on the actively discarded packets information may be reported by extending the RTCP feedback messages with payload type equal to "payload specific feedback message (PSFB)" (206) defined in IETF RFC 4585.

The frequency of RTCP messages (XR packet or RTCP feedback) for reporting the information on actively discarded packets may be negotiated during the configuration phase or at the time of RTP session establishment.

RTCP XR packet-based reporting. In some embodiments, the actively discarded packets information recorded at a UE or an RTP receiver is be reported to the AF or AS by enhancing the RTCP XR packets, which are specified in IETF RFC 3611. The RTCP XR report is identified by payload type (PT) equal to 207, which refers to an extended report block message. For reporting of discarded AL-FEC obsolete PDUs information using RTCP XR messages, the block type (BT) defined in IETF RFC 3611 can be extended with the value 41.

Extended Report block for actively discarded packets information. This extended report block type permits detailed reporting of actively discarded packets or AL-FEC obsolete discarded PDUs by a UE or RTP receiver to a media AS, media AF, or RTP sender. These reports can be used, for example, to determine that the application either recovered all the media content that was sent from the AS and that only a few packets were actively discarded, or a large number of packets were actively discarded by the base station. Based on this information, the AS may decide to decrease or increase the amount of redundancy that is added with AL-FEC or to change a codec setting so that better quality media is sent to the UE.

Figure 6:
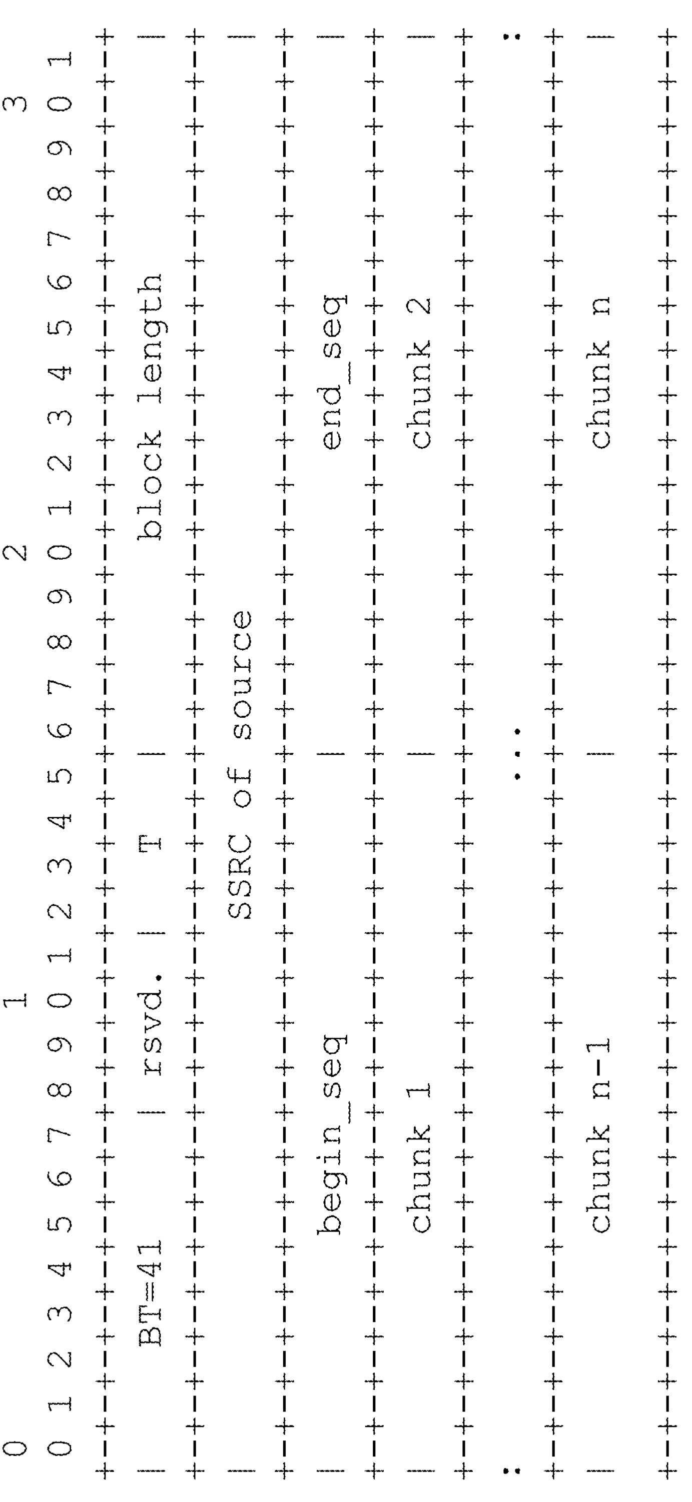
FIG. 6 illustrates an RTCP XR block format for reporting actively discarded packets information, according to one or more embodiments of the present disclosure.

In an example embodiment, the actively discarded packets (discarded AL-FEC obsolete PDUs) information Report Block with BT value equal to 41 has a format as illustrated in FIG. 6.

In an example embodiment, the semantics of the fields in an actively discarded RTP packets information Extended Report (XR) block are as follows.

- block type (BT) [8 bits]: Actively discarded RTP packets information Report Block is identified by the constant 41.
- resv [4 bits]: This field may be reserved for future definition. In the absence of such definition, the bits in this field may be set to zero and may be ignored by the receiver.
- T [4 bits]: The amount of thinning performed on the sequence number space. Only those packets with sequence numbers 0 mod 2^T are reported on by this block. A value of 0 indicates that there is no thinning, and all packets are reported on. The maximum thinning is one packet in every 32,768 (amounting to two packets within each 16-bit sequence space).
- block length [16 bits]: The length of this report block, including the header, in 32-bit words minus one.
- SSRC of source: 32 bits. The SSRC of the RTP data packet source being reported upon by this report block.
- begin_seq [16 bits]: The first sequence number that this block reports on.
- end_seq [16 bits]: The last sequence number that this block reports on plus one.
- chunk i [16 bits]: There are three chunk types: run length, bit vector, and terminating null, defined in the following sections. If the chunk is all zeroes, then it is a terminating null chunk. Otherwise, the left-most bit of the chunk determines its type: 0 for run length and 1 for bit vector, as defined in IETF RFC 3611.

This block type permits detailed reporting of actively discarded packets or AL-FEC obsolete PDUs. Since a boolean trace of actively discarded RTP packets is potentially lengthy, this block type permits the trace to be compressed through run length encoding (RLE). To further reduce the block size, active discarding event reports can be systematically dropped from the trace in a mechanism called thinning that is described in IETF RFC 3611. A participant that generates an actively discarded packets RLE Report Block should favor accuracy in reporting on observed events.

SDP signaling and attributes. IETF RFC 3611 defines the SDP attribute "rtcp-xr" that can be used to signal participants in a media session that they should use the specified XR blocks. This attribute is extendable with new parameters to cover any new type of XR report blocks.

The extended RTCP XR blocks with actively discarded packets information SDP attribute is defined as below in Augmented Backus-Naur Form (ABNF).

```
rtcp-xr-attrib =      "a=" "rtcp-xr" ":" [xr-format *(SP xr-format)] CRLF
  xr-format =         / xr-active-discard-rle
                      / format-ext
  xr-active-discard-rle= "active-discard-rle" ["=" max-size]
  max-size            = 1*DIGIT ; maximum block size in octets
  DIGIT               = %x30-39
  format-ext          = non-ws-string
  non-ws-string       = 1*(%x21-FF)
  CRLF                = %d13.10
```

The "rtcp-xr" attribute contains zero, one, or more XR block related parameters. Each parameter signals functionality for an XR block, or a group of XR blocks. The attribute is extensible so that parameters can be defined for any future XR block. In this embodiment, the parameters are extended to support delivery of information on the actively discarded RTP packets over RTCP packets with XR type. Example parameter names and their corresponding XR formats are as follows:

| Parameter name | XR block (block type and name) |
|---|---|
| active-discard-rle | 41 Active discarded RTP packets or discarded AL-FEC obsolete PDUs |

The "active-discard-rle" parameter may specify an integer value. This value indicates the largest size the whole report block should have in octets.

RTCP feedback message based reporting. In some embodiments, the actively discarded RTP packets information recorded at the UE or the RTP receiver is reported to the AS/AF or RTP sender device using RTCP feedback messages, which are specified in IETF RFC 4585. The RTCP feedback message is identified by payload type (PT) equal to 205, which refers to a transport layer feedback (RTPFB) message. In the case of active discarded RTP packets information feedback messages, the feedback message type (FMT) may be set to the value 16. The RTCP feedback method and RTCP XR block method may involve transmitting active discarded RTP packets or active discarded AL-FEC obsolete PDUs in both immediate feedback and early RTCP modes.

In another embodiment, the actively discarded RTP packets information recorded at the UE or the RTP receiver can be reported to the AS/AF or RTP sender device using RTCP feedback messages, which are specified in IETF RFC 4585. The RTCP feedback message is identified by payload type (PT) equal to 206, which refers to a payload specific feedback (RTPFB) message. In the case of active discarded RTP packets information feedback messages, the feedback message type (FMT) may be set to the value 16.

Figures 7, 8:
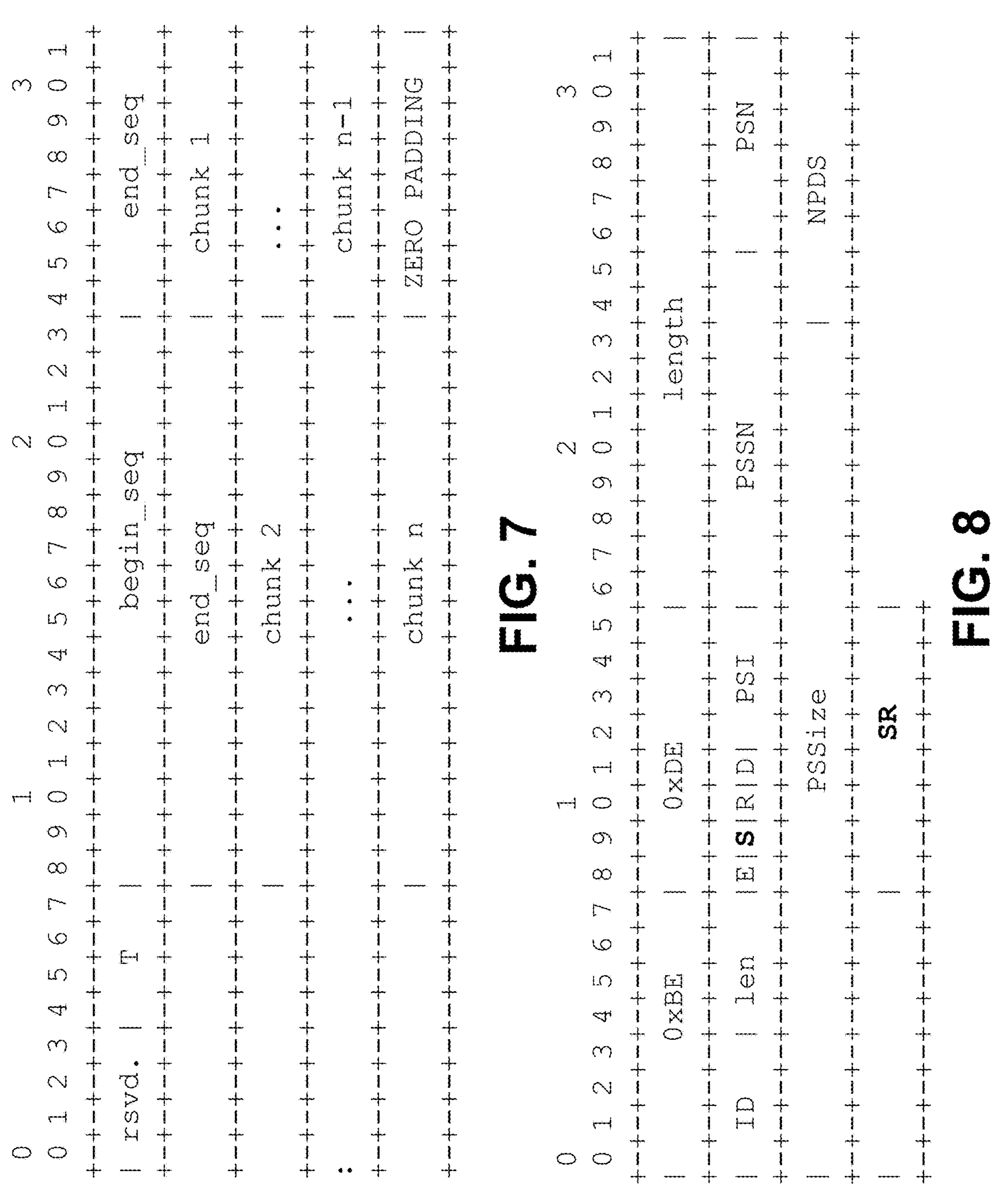
FIG. 7 illustrates feedback control information for an RTCP feedback message for reporting active discarded RTP packets information, according to one or more embodiments of the present disclosure.
FIG. 8 illustrates a one-byte RTP Header Extension format for the marking of PDU Sets and the AL-FEC success ratio, according to one or more embodiments of the present disclosure.

In an example embodiment, the feedback control information (FCI) for an RTCP feedback message with active discarded RTP packets information data may have a format as illustrated in FIG. 7.

The semantics of the fields in active discarded RTP packets information RTCP feedback message may be as follows:

- resv [4 bits]: This field is reserved for future definition. In the absence of such definition, the bits in this field may be set to zero and may be ignored by the receiver.
- T [4 bits]: The amount of thinning performed on the sequence number space. Only those packets with sequence numbers 0 mod 2^T are reported on by this block. A value of 0 indicates that there is no thinning, and all packets are reported on. The maximum thinning is one packet in every 32,768 (amounting to two packets within each 16-bit sequence space).
- begin_seq [16 bits]: The first sequence number that this block reports on.
- end_seq [16 bits]: The last sequence number that this block reports on plus one.
- chunk i [16 bits]: There are three chunk types: run length, bit vector, and terminating null, described in further detail below. If the chunk is all zeroes, then it is a terminating null chunk. Otherwise, the left most bit of the chunk determines its type: 0 for run length and 1 for bit vector, as defined in IETF RFC 3611.

SDP signaling for RTCP feedback message. In an example embodiment, an RTP receiver supporting reporting of active discarded RTP packets information may signal the capability in SDP for all media content where active discarding of PDUs is supported at a base station in a PDU session, and a UE is able to fetch that information from the base station. Active discarded RTP packets information reporting support may be offered by including the a=rtcp-fb attribute under the relevant media line scope. The active discarded RTP packets information reporting support using the RTCP feedback method may be expressed with the following parameter: active-discarding-rle. A wildcard payload type ("*") may be used to indicate that the RTCP feedback attribute for active discarded RTP packets information reporting support signaling applies to all payload types. If the same active discarded RTP packets information is specified for a subset of the payload types, several "a=rtcp-fb" lines can be used. Here is an example usage of this attribute to signal active discarded RTP packets information report relative to a media line based on the RTCP feedback method:

$$a = rtcp\text{-}fb{:}{*}\ ack\ \text{active-discarding-}rle$$

In another embodiment, the actively discarded RTP packets information recorded at the UE or the RTP receiver are reported to the AS/AF or RTP sender device using data channel messages, as specified in clause 8.3.3 of TS 26.565, "Split Rendering Media Service Enabler." The message payload format of the actively discarded RTP packets information report may be as specified in FIG. 7. The message type for the actively discarded packets information report may be "urn:3gpp:activediscarding".

Signalling AL-FEC Success Ratio

In some embodiments, when the AL-FEC success ratio is changing dynamically, the success ratio information may be signaled in the data plane by extending the PDU Set Marking RTP HE defined in TS 26.522.

In some embodiments, when the AL-FEC success ratio information is static, this information is signaled to the UE and the 5GS components by extending the ApplicationFlowDescription.mediaTransportParameters property defined in TS 26.510. This property may also be extended to signal whether the AL-FEC success ratio information is static or dynamic.

When the success ratio is dynamically changing by an AL-FEC controller, this information may be passed in the PDU set marking information using the RTP Header Extension mechanism. The dynamically changing success ratio information may be signalled in the data plane. In the data plane this information may be carried in the PDUs of the PDU sets.

In another embodiment, when the AL-FEC success ratio is static throughout the RTC session, this information may be signaled in the configuration information from the AF to UE and 5GS components.

Data plane signaling of dynamic AL-FEC success ratio. In an example embodiment, a one-byte RTP Header Extension for the marking of PDU Sets and the AL-FEC success ratio is provided as illustrated in FIG. 8.

Figures 9, 10:
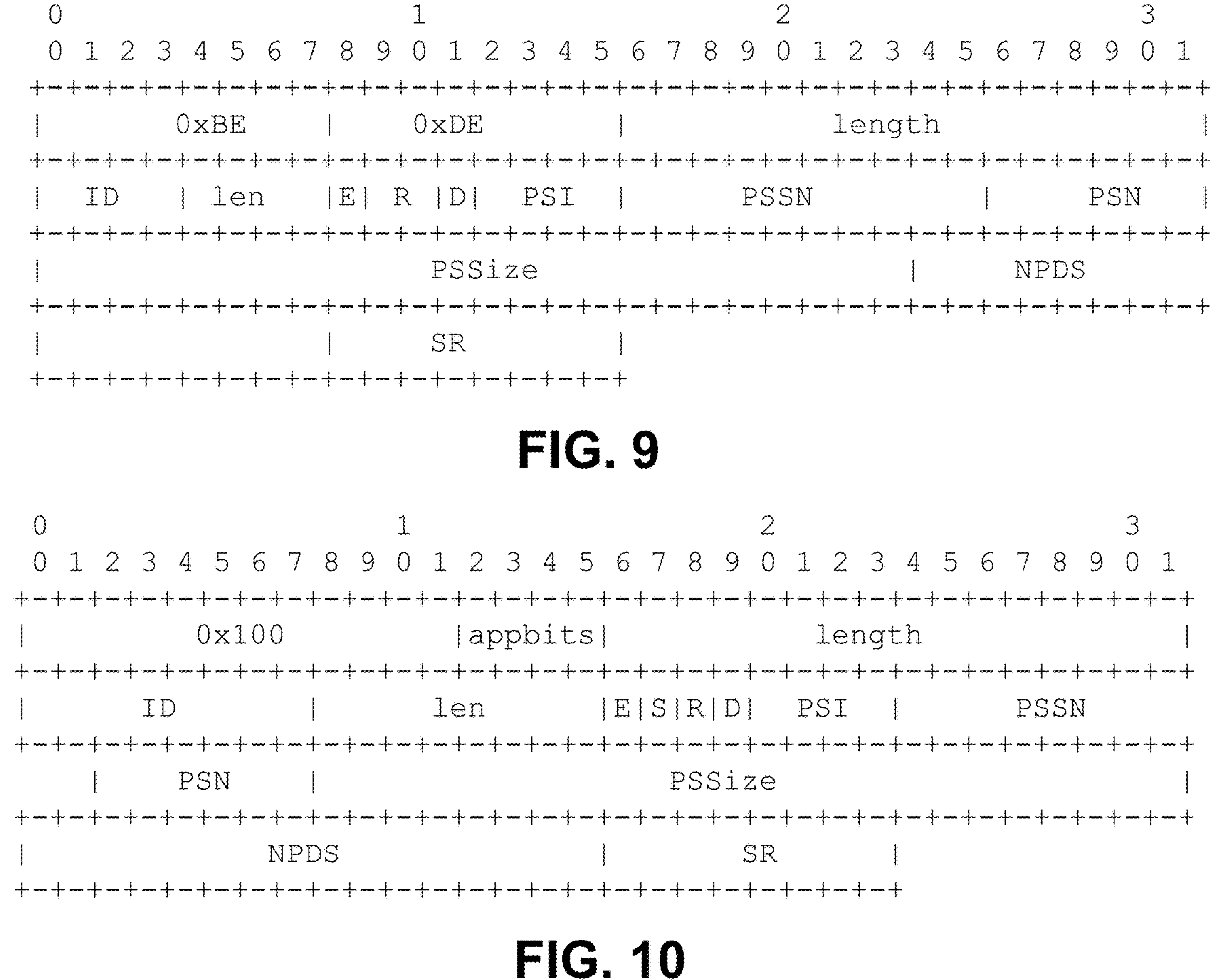
FIG. 9 illustrates another one-byte RTP Header Extension format for the marking of PDU Sets and the AL-FEC success ratio, according to one or more embodiments of the present disclosure.
FIG. 10 illustrates an example two-byte RTP Header Extension for the marking of PDU Sets and the AL-FEC success ratio, according to one or more embodiments of the present disclosure.

In another embodiment, the one-byte RTP Header Extension for the marking of PDU Sets and the AL-FEC success ratio may have the format as shown in FIG. 9.

In some embodiments, the semantics of the AL-FEC success ratio field of the RTP Header Extension for the marking of PDU Set may be as follows:

- dynamic success ratio [S] (1 bit): This field indicates if the AL-FEC success ratio is present or not in the RTP HE. When the AL-FEC success ratio is indicated in the RTP HE, this flag value is set to ONE otherwise set to ZERO.
- success ratio [SR] (8 bits): This field indicates success ratio of an AL-FEC media stream. The success ratio is equal to the ratio of number PDUs of a PDU Set that the UE needs to successfully recover the transmitted media to the total number of PDUs present in that PDU Set which includes both the source media and the AL-FEC redundant media. This information is expressed using 8 bits. This field shall not be present when the dynamic success ratio flag is set to ZERO. When the dynamic success ratio flag is set to ONE, but the RTP sender is not able to provide the AL-FEC success ratio value of a PDU Set, it shall set this field value to 0 in all PDUs of that PDU Set.

Two-byte RTP Header Extension Format. An example two-byte RTP Header Extension for the marking of PDU Sets and the AL-FEC success ratio may be implemented using the format illustrated in FIG. 10.

Figure 11:
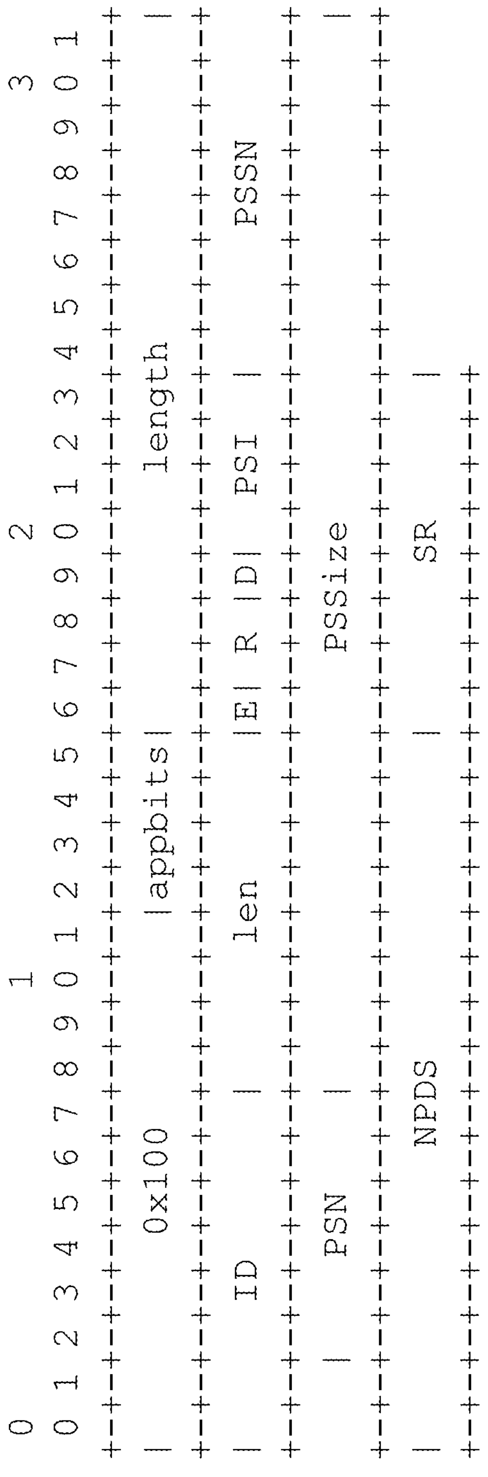
FIG. 11 illustrates another example two-byte RTP Header Extension for the marking of PDU Sets and the AL-FEC success ratio, according to one or more embodiments of the present disclosure.

In some embodiments, the two-byte RTP Header Extension for the marking of PDU Sets and the AL-FEC success ratio is implemented as illustrated in FIG. 11.

The semantics of the AL-FEC success ratio field of the RTP Header Extension for the marking of PDU Set may be as follows:

dynamic success ratio [S] (1 bit): This field indicates if the AL-FEC success ratio is present or not in the RTP HE. When the AL-FEC success ratio is indicated in the RTP HE, this flag value is set to ONE otherwise set to ZERO.

success ratio [SR] (8 bits): This field indicates success ratio of an AL-FEC media stream. The success ratio is equal to the ratio of number PDUs of a PDU Set that the UE needs to successfully recover the transmitted media to the total number of PDUs present in that PDU Set which includes both the source media and the AL-FEC redundant media. This information is expressed using 8 bits. This field is not present when the dynamic success ratio flag is set to ZERO. When the dynamic success ratio flag is set to ONE, but the RTP sender is not able to provide the AL-FEC success ratio value of a PDU Set, it may set this field value to 0 in all PDUs of that PDU Set.

SDP Signaling. In an example embodiment, the ABNF syntax for the extmap attribute for the signaling of RTP HE for PDU Set marking defined in TS 26.522, "5G Real-time Media Transport Protocol Configurations" is extended as follows, extending the ABNF in RFC 8285:

```
extensionname = "urn:3gpp:pdu-set-marking:rel-18"
extensionattributes = *3(format / "pdu-set-size" / "num-pdus-in-pdu-set" /
"dyn-FEC-success-ratio")
format = "short" / "long"
```

The attributes extension semantics may be as follows:

dyn-FEC-success-ratio: if present, this extension attribute indicates that the RTP sender will provide the dynamically changing AL-FEC success ratio information (SR) in the RTP HE with every RTP packet. This results in an additional byte of length for the RTP HE. This extension attribute may not be included more than once.

Control plane signaling of AL-FEC success ratio information. When the success ratio is dynamically changing by an AL-FEC controller, this information may be carried in the PDU Set Marking RTP HE. The presence of success ratio information in an RTP HE may be signalled to a UE or RTP receiver by extending the ApplicationFlowDescription.mediaTransportParameters property defined in TS 26.510 and TS 26.113. When the AL-FEC success ratio is static in an RTC session, the success ratio information may be signalled to a UE or RTP receiver by extending the mediaTransportParameters property.

When PDU Set marking is enabled for the selected Policy Template as specified in clause 5.3.3.2 of TS 26.510, the Media Session Handler may populate the ApplicationFlowDescription.mediaTransportParameters property as follows when creating or updating a Dynamic Policy Instance based on that Policy Template:

The transportProto property is set to the value SRTP.

The rtpHeaderExt property is populated as follows:

RtpHeaderExtInfo.rtpHeaderExtType is set to PDU_SET_MARKING.

RtpHeaderExtInfo.rtpHeaderExtId is set to the value of the ID field to be used by the RTC endpoint (e.g., the RTC Access Function of an RTC Client) in the RTP Header Extension for PDU Set Marking on the application flow in question, as specified in clause 4.2 of TS 26.522 [36].

RtpHeaderExtInfo.longFormat is set according to the use of the one- or two-byte RTP Header Extension for PDU Set Marking, as specified in clause 4.2.1 of TS 26.522 [36].

RtpHeaderExtInfo.pduSetSizeActive is set to reflect the presence of the PDU Set Size field in the RTP Header Extension for PDU Set Marking, as specified in clause 4.2.4 of TS 26.522 [36].

RtpHeaderExtInfo property may be extended to signal the presence of dynamic AL-FEC success ratio information in the PDU Set Marking RTP HE as below.

RtpHeaderExtInfo.dynamicALFECSuccessRatio is set to reflect the presence of the AL-FEC success ratio field in the RTP Header Extension for PDU Set Marking, as specified in clause 4.2.1.2 and 4.2.1.4 of this document.

RtpHeaderExtInfo.ALFECSuccessRatio shall reflect the value of static AL-FEC success ratio. The success ratio is equal to the ratio of number PDUs of a PDU Set that the UE/RTP receiver needs to successfully recover the transmitted media to the total number of PDUs present in that PDU Set which includes both the source media and the AL-FEC redundant media. This information is expressed using float. This field is not present when the dynamicALFECSuccessRatio field is set to ZERO or False.

As illustrated in FIG. 12, in some embodiments, at 902 an Application Server (AS), Application Function (AF), or RTP sender sending a first plurality of packets using forward error correction, FEC, with an initial success ratio. The packets are delivered to a UE or RTP Receiver through a base station, which delivers the packets at 904 using active discarding. The UE or RTP receiver receives the packets at 906 that have been delivered (e.g. the packets that were not actively discarded or considered obsolete), and at 908 it sends a report regarding a number of packets in the first plurality that were not delivered because they were actively discarded or considered obsolete. At 910, the report is received, and an updated success ratio is selected at 912 based at least in part on the report. At 914, the updated success ratio is reported, and the updated success ratio is received at 916. At 918, a second plurality of packets is sent using FEC with the updated success ratio. At 920, the base station may deliver the second plurality of packets using active discarding based on the updated success ratio, and the delivered packets are received at 922.

For reference, the following are some abbreviations and acronyms used in the present disclosure.

Figure 13A:
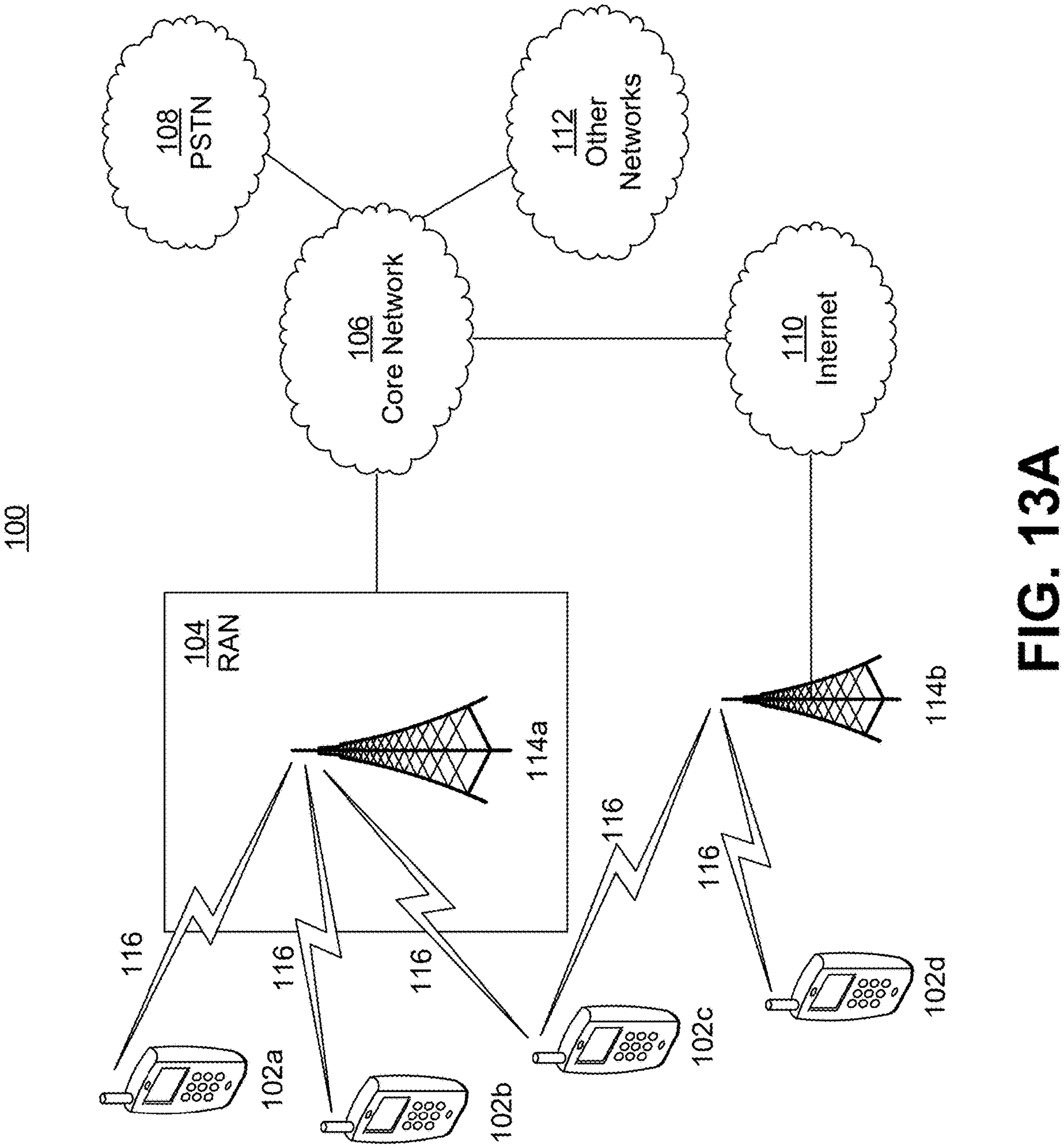
FIG. 13A is a system diagram illustrating an example communications system in which one or more disclosed embodiments may be implemented.

AVP Audio-Visual Profile
AVPF Audio-Visual Profile with Feedback
BT Block Type
FB Feedback
FCI Feedback Control Information
FMT Format Type
HE Header Extension
LSW Least Significant Word
MAF Media Access Function
MeCAR Media Capabilities for AR
MSW Most Significant Word
NTP Network Time Protocol
PDU Packet Data Unit
PSFB Payload Specific Feedback
PD Permanent Document
PT Payload Type
RTCP Real-Time transport Control Protocol RTP Real-Time transport Protocol
RTP HE Real-Time transport Protocol Header Extension
RTSP Real Time Streaming Protocol
SAP Session Announcement Protocol
SDP Session Description Protocol
SRS Split Rendering Server
SRTP Secure Real-Time Protocol
SSRC Synchronization Source
TR Technical Report
TS Technical Specification
UE User Equipment
URN Uniform Resource Name
VoIP Voice over IP
XR Extended Report Example Networks for Implementation of the Embodiments FIG. 13A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 13A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 13A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 13A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 13A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 13A may be configured to communicate with the base station 114*a*, which may employ a cellular-based radio technology, and with the base station 114*b*, which may employ an IEEE 802 radio technology.

Figure 13B:
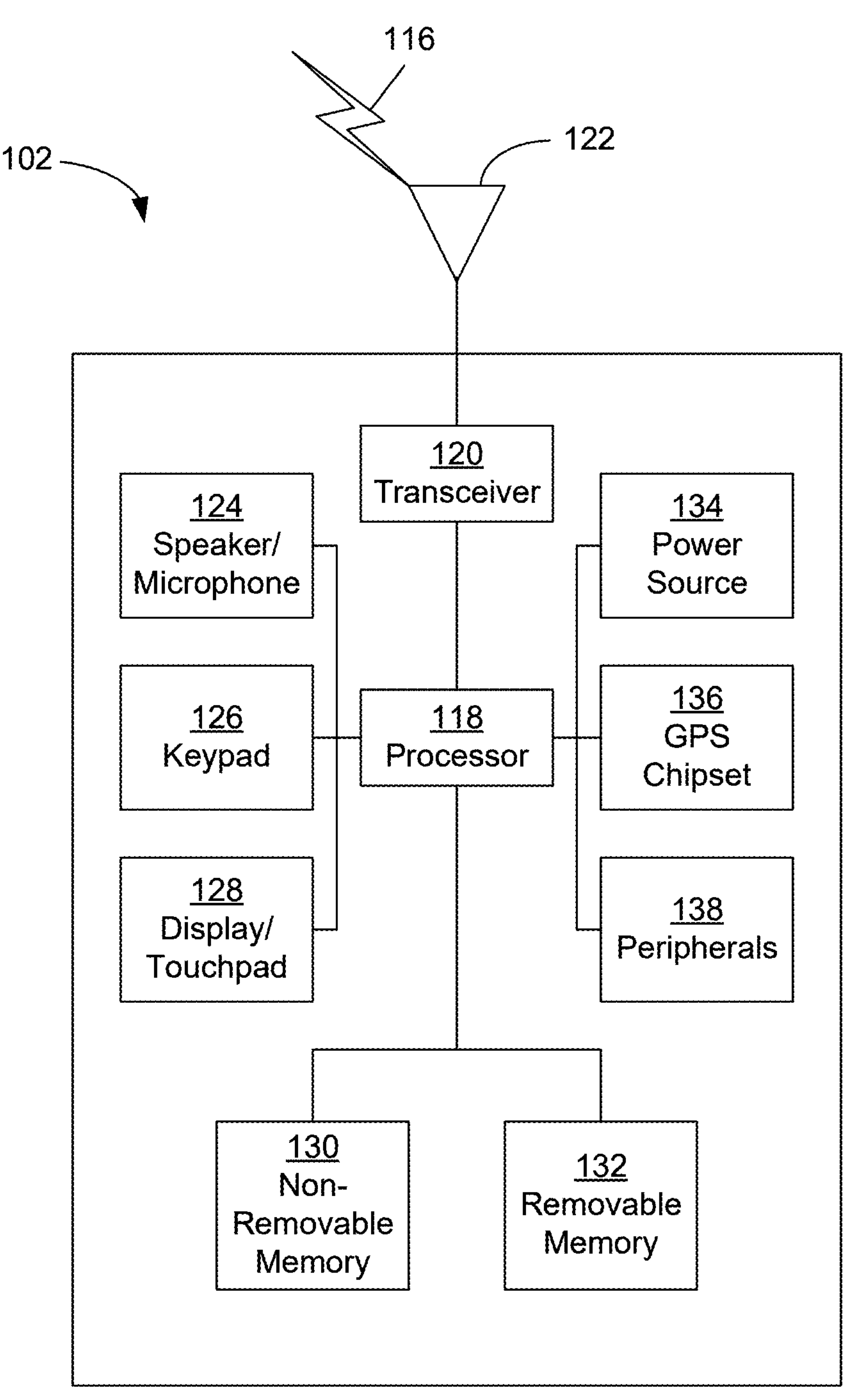
FIG. 13B is a system diagram illustrating an example wireless transmit/receive unit (WTRU) that may be used within the communications system illustrated in FIG. 13A according to an embodiment.

FIG. 13B is a system diagram illustrating an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 13C:
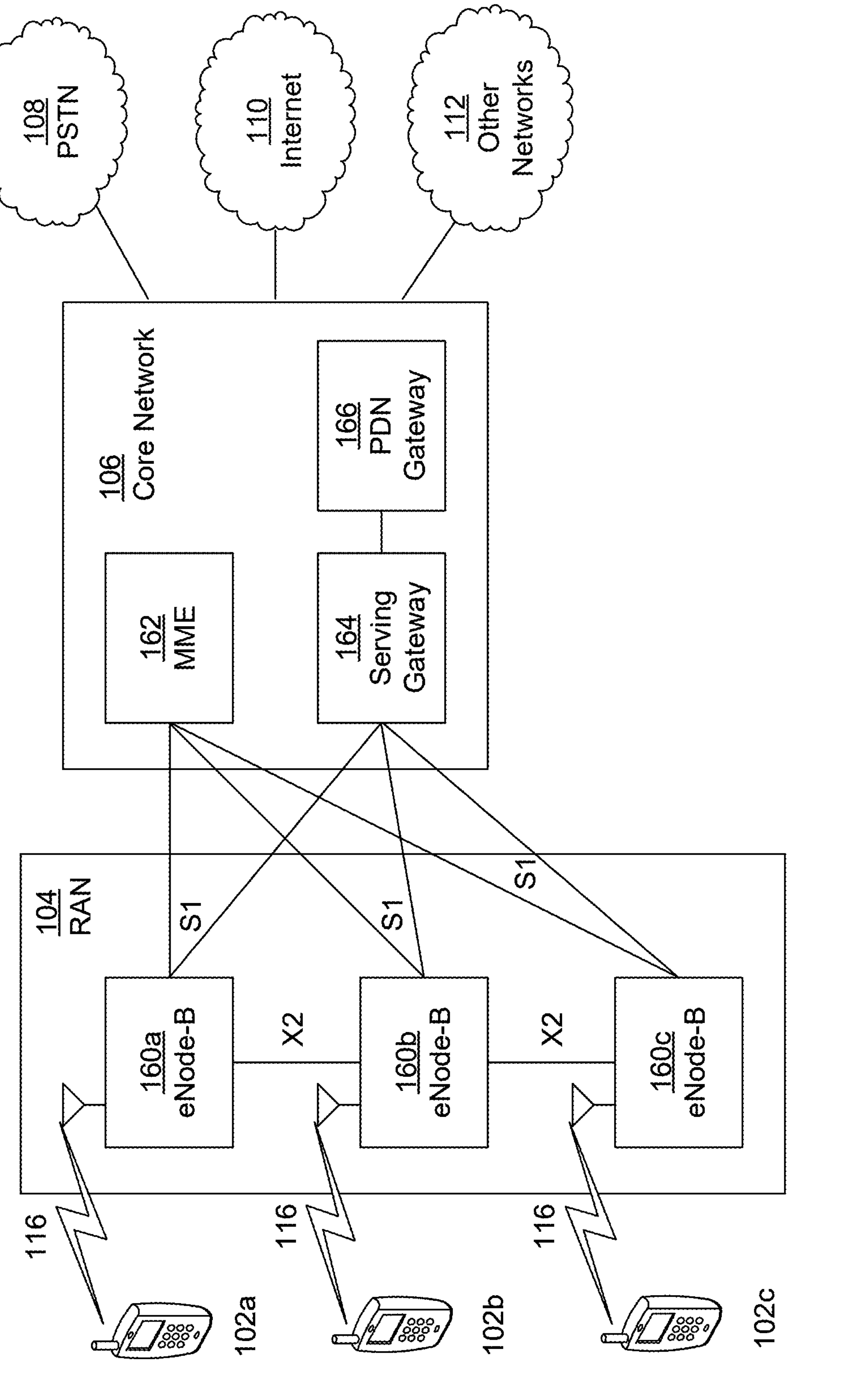
FIG. 13C is a system diagram illustrating an example radio access network (RAN) and an example core network (CN) that may be used within the communications system illustrated in FIG. 1A according to an embodiment.

FIG. 13C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 13C, the eNode-Bs 160*a*, 160*b*, 160*c* may communicate with one another over an X2 interface.

The CN 106 shown in FIG. 13C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102$a$, 102$b$, 102$c$ and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102$a$, 102$b$, 102$c$ with access to the other networks 112, which may include other wired and/or wireless networks that are owned and/or operated by other service providers.

Although the WTRU is described in FIGS. 13A-13D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 13D:
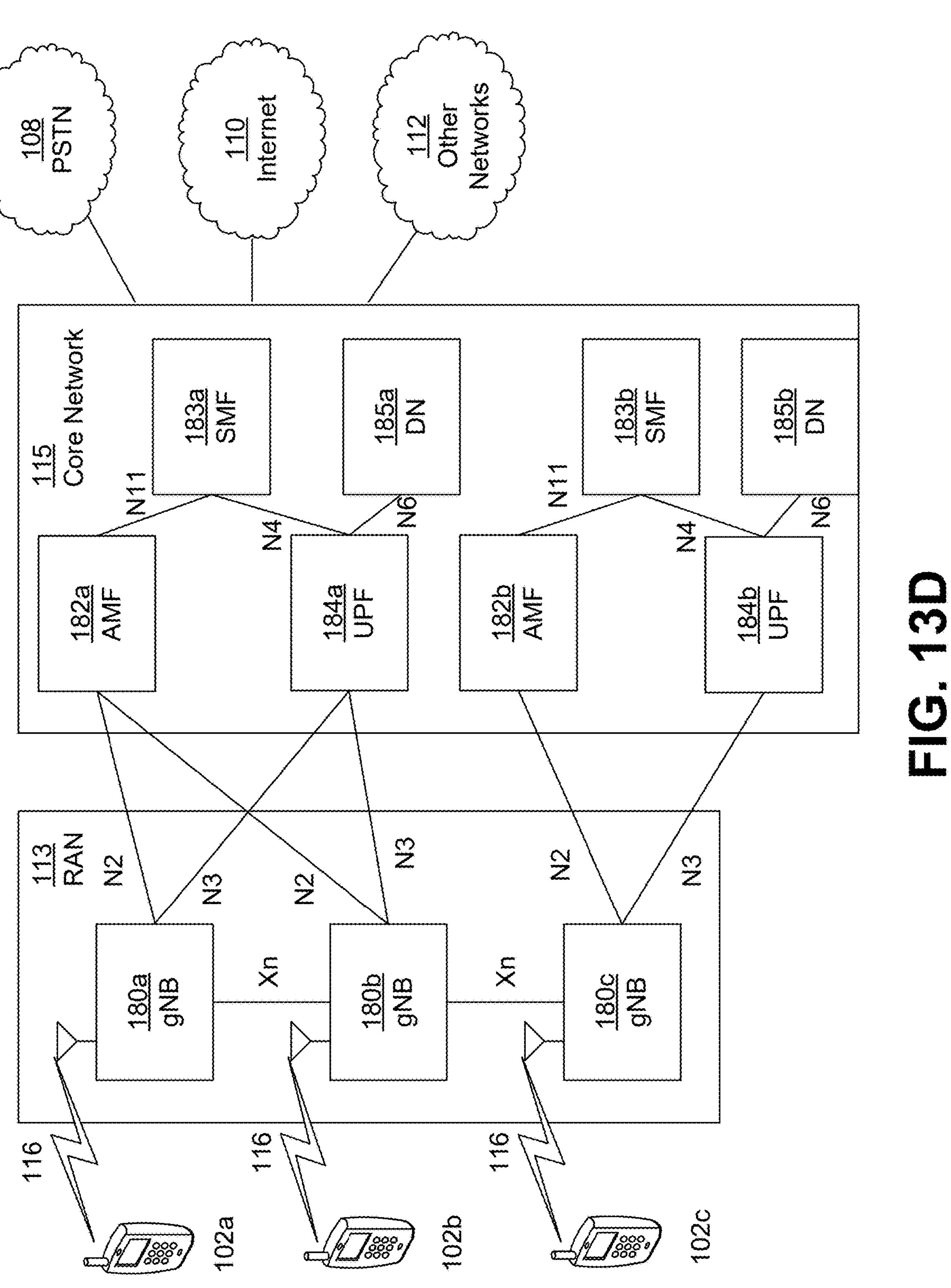
FIG. 13D is a system diagram illustrating a further example RAN and a further example CN that may be used within the communications system illustrated in FIG. 1A according to an embodiment.

FIG. 13D is a system diagram illustrating the RAN 113 and the CN 115 according to an embodiment. As noted above, the RAN 113 may employ an NR radio technology to communicate with the WTRUs 102$a$, 102$b$, 102$c$ over the air interface 116. The RAN 113 may also be in communication with the CN 115.

The RAN 113 may include gNBs 180$a$, 180$b$, 180$c$, though it will be appreciated that the RAN 113 may include any number of gNBs while remaining consistent with an embodiment. The gNBs 180$a$, 180$b$, 180$c$ may each include one or more transceivers for communicating with the WTRUs 102$a$, 102$b$, 102$c$ over the air interface 116. In one embodiment, the gNBs 180$a$, 180$b$, 180$c$ may implement MIMO technology. For example, gNBs 180$a$, 108$b$ may utilize beamforming to transmit signals to and/or receive signals from the gNBs 180_a_, 180_b_, 180_c_. Thus, the gNB 180_a_, for example, may use multiple antennas to transmit wireless signals to, and/or receive wireless signals from, the WTRU 102_a_. In an embodiment, the gNBs 180_a_, 180_b_, 180_c_ may implement carrier aggregation technology. For example, the gNB 180_a_ may transmit multiple component carriers to the WTRU 102_a_ (not shown). A subset of these component carriers may be on unlicensed spectrum while the remaining component carriers may be on licensed spectrum. In an embodiment, the gNBs 180_a_, 180_b_, 180_c_ may implement Coordinated Multi-Point (COMP) technology. For example, WTRU 102_a_ may receive coordinated transmissions from gNB 180_a_ and gNB 180_b_ (and/or gNB 180_c_).

The WTRUs 102_a_, 102_b_, 102_c_ may communicate with gNBs 180_a_, 180_b_, 180_c_ using transmissions associated with a scalable numerology. For example, the OFDM symbol spacing and/or OFDM subcarrier spacing may vary for different transmissions, different cells, and/or different portions of the wireless transmission spectrum. The WTRUs 102_a_, 102_b_, 102_c_ may communicate with gNBs 180_a_, 180_b_, 180_c_ using subframe or transmission time intervals (TTIs) of various or scalable lengths (e.g., containing varying number of OFDM symbols and/or lasting varying lengths of absolute time).

The gNBs 180_a_, 180_b_, 180_c_ may be configured to communicate with the WTRUs 102_a_, 102_b_, 102_c_ in a standalone configuration and/or a non-standalone configuration. In the standalone configuration, WTRUs 102_a_, 102_b_, 102_c_ may communicate with gNBs 180_a_, 180_b_, 180_c_ without also accessing other RANs (e.g., such as eNode-Bs 160_a_, 160_b_, 160_c_). In the standalone configuration, WTRUs 102_a_, 102_b_, 102_c_ may utilize one or more of gNBs 180_a_, 180_b_, 180_c_ as a mobility anchor point. In the standalone configuration, WTRUs 102_a_, 102_b_, 102_c_ may communicate with gNBs 180_a_, 180_b_, 180_c_ using signals in an unlicensed band. In a non-standalone configuration WTRUs 102_a_, 102_b_, 102_c_ may communicate with/connect to gNBs 180_a_, 180_b_, 180_c_ while also communicating with/connecting to another RAN such as eNode-Bs 160_a_, 160_b_, 160_c_. For example, WTRUs 102_a_, 102_b_, 102_c_ may implement DC principles to communicate with one or more gNBs 180_a_, 180_b_, 180_c_ and one or more eNode-Bs 160_a_, 160_b_, 160_c_ substantially simultaneously. In the non-standalone configuration, eNode-Bs 160_a_, 160_b_, 160_c_ may serve as a mobility anchor for WTRUs 102_a_, 102_b_, 102_c_ and gNBs 180_a_, 180_b_, 180_c_ may provide additional coverage and/or throughput for servicing WTRUs 102_a_, 102_b_, 102_c_.

Each of the gNBs 180_a_, 180_b_, 180_c_ may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184_a_, 184_b_, routing of control plane information towards Access and Mobility Management Function (AMF) 182_a_, 182_b_ and the like. As shown in FIG. 13D, the gNBs 180_a_, 180_b_, 180_c_ may communicate with one another over an Xn interface.

The CN 115 shown in FIG. 13D may include at least one AMF 182_a_, 182_b_, at least one UPF 184_a_, 184_b_, at least one Session Management Function (SMF) 183_a_, 183_b_, and possibly a Data Network (DN) 185_a_, 185_b_. While each of the foregoing elements are depicted as part of the CN 115, it will be appreciated that any of these elements may be owned and/or operated by an entity other than the CN operator.

The AMF 182_a_, 182_b_ may be connected to one or more of the gNBs 180_a_, 180_b_, 180_c_ in the RAN 113 via an N2 interface and may serve as a control node. For example, the AMF 182_a_, 182_b_ may be responsible for authenticating users of the WTRUs 102_a_, 102_b_, 102_c_, support for network slicing (e.g., handling of different PDU sessions with different requirements), selecting a particular SMF 183_a_, 183_b_, management of the registration area, termination of NAS signaling, mobility management, and the like. Network slicing may be used by the AMF 182_a_, 182_b_ in order to customize CN support for WTRUs 102_a_, 102_b_, 102_c_ based on the types of services being utilized WTRUs 102_a_, 102_b_, 102_c_. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183_a_, 183_b_ may be connected to an AMF 182_a_, 182_b_ in the CN 115 via an N11 interface. The SMF 183_a_, 183_b_ may also be connected to a UPF 184_a_, 184_b_ in the CN 115 via an N4 interface. The SMF 183_a_, 183_b_ may select and control the UPF 184_a_, 184_b_ and configure the routing of traffic through the UPF 184_a_, 184_b_. The SMF 183_a_, 183_b_ may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184_a_, 184_b_ may be connected to one or more of the gNBs 180_a_, 180_b_, 180_c_ in the RAN 113 via an N3 interface, which may provide the WTRUs 102_a_, 102_b_, 102_c_ with access to packet-switched networks, such as the Internet 110, to facilitate communications between the WTRUs 102_a_, 102_b_, 102_c_ and IP-enabled devices. The UPF 184, 184_b_ may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102_a_, 102_b_, 102_c_ with access to the other networks 112, which may include other wired and/or wireless networks that are owned and/or operated by other service providers. In one embodiment, the WTRUs 102_a_, 102_b_, 102_c_ may be connected to a local Data Network (DN) 185_a_, 185_b_ through the UPF 184_a_, 184_b_ via the N3 interface to the UPF 184_a_, 184_b_ and an N6 interface between the UPF 184_a_, 184_b_ and the DN 185_a_, 185_b_.

In view of FIGS. 13A-13D, and the corresponding description, one or more, or all, of the functions described herein with regard to one or more of: WTRU 102_a-d_, Base Station 114_a-b_, eNode-B 160_a-c_, MME 162, SGW 164, PGW 166, gNB 180_a-c_, AMF 182_a-b_, UPF 184_a-b_, SMF 183_a-b_, DN 185_a-b_, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

One or more embodiments provide a computer program comprising instructions which when executed by one or more processors cause such processors to perform the encoding and/or decoding methods according to any of the embodiments described above. One or more embodiments also provide a computer readable storage medium having stored thereon instructions for encoding or decoding video data according to the methods described above.

One or more embodiments provide a computer readable storage medium having stored thereon video data generated according to the methods described above. One or more embodiments also provide a method and apparatus for transmitting or receiving video data generated according to the methods described above.

The embodiments described herein may be implemented in, for example, a method or a process, an apparatus, a software program, a data stream, or a signal. Even if only discussed in the context of a single form of implementation (e.g., as a method), the implementation of such features may also be implemented in other forms. An apparatus may be implemented in, for example, appropriate hardware, software, and firmware. Corresponding methods may be implemented in, for example, a processor.

Various numeric values are used in the present application. Such specific values are for example purposes and the embodiments described are not limited to these specific values.

Various methods are described herein, and such methods comprise one or more steps or actions for achieving the described method. Unless a specific order of steps or actions is required for the proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an order to the operations unless specifically required.

The present disclosure may refer to "determining" various pieces of information. Determining information may include one or more of, for example, estimating, calculating, predicting, or retrieving (e.g., from memory) the information.

The present disclosure may refer to "accessing" various pieces of information. Accessing information may include one or more of, for example, receiving, retrieving (e.g., from memory), storing, moving, copying, calculating, determining, predicting, or estimating the information. Similarly, the present disclosure may refer to "receiving" various pieces of information. Receiving information may include one or more of, for example, accessing or retrieving (e.g., from memory) the information.

It is to be understood that use of any of the following "/", "and/or", and "at least one of" is intended to encompass all possible selections of listed items, taken either individually or in any combination thereof.

While specific embodiments have been described in the foregoing description in connection with the accompanying drawings, it should be understood that embodiments described herein are examples only and should not be taken as limiting the scope of the present disclosure or the following claims. Although features and elements are described herein in particular combinations, those of ordinary skill in the art will appreciate that such features or elements may be used alone or in any combination with the other features and elements. It is understood, therefore, that the overall teachings of the present disclosure are not limited to the particular embodiments, implementations, and examples disclosed herein, but are intended to cover variations, modifications, and alternatives as defined by the appended claims and any and all equivalents thereof.

The invention claimed is:

1. A method comprising:

sending a first plurality of packets using forward error correction, FEC, with an initial success ratio;

receiving a report regarding a number of packets in the first plurality that were not delivered because they were actively discarded or considered obsolete;

selecting an updated success ratio based at least in part on the report; and sending a second plurality of packets using FEC with the updated success ratio.

2. The method of claim 1, wherein the report is received from a user equipment, UE.

3. The method of claim 1, wherein the report is received in a real-time transport control protocol, RTCP, message.

4. The method of claim 3, wherein the report is received in a real-time transport control protocol extended reports, RTCP XR, message.

5. The method of claim 3, wherein the report is received in a real-time transport control protocol feedback, RTCPFB, message.

6. The method of claim 1, wherein the report includes a Boolean trace, or a run-length encoded Boolean trace, identifying packets that were actively discarded or considered obsolete.

7. The method of claim 6, wherein a selected fraction of the packets are excluded from the Boolean trace according to a thinning mechanism.

8. The method of claim 1, wherein the report is received in a data channel message.

9. The method of claim 1 further comprising signaling the updated success ratio in a data plane.

10. The method of claim 9, wherein the updated success ratio is signaled in a one-byte or two-byte real-time transport protocol header extension format.

11. The method of claim 1, further comprising signaling the updated success ratio in a control plane.

12. An apparatus comprising one or more processors configured to perform at least:

sending a first plurality of packets using forward error correction, FEC, with an initial success ratio;

receiving a report regarding a number of packets in the first plurality that were not delivered because they were actively discarded or considered obsolete;

selecting an updated success ratio based at least in part on the report; and sending a second plurality of packets using FEC with the updated success ratio.

13. The apparatus of claim 12, wherein the report is received from a user equipment, UE.

14. The apparatus of claim 12, wherein the report is received in a real-time transport control protocol, RTCP, message.

15. The apparatus of claim 14, wherein the report is received in a real-time transport control protocol extended reports, RTCP XR, message.

16. The apparatus of claim 14, wherein the report is received in a real-time transport control protocol feedback, RTCPFB, message.

17. The apparatus of claim 12, wherein the report is received in a data channel, message.

18. The apparatus of claim 12, wherein the report includes a Boolean trace, or a run-length encoded Boolean trace, identifying packets that were actively discarded or considered obsolete.

19. The apparatus of claim 18, wherein a selected fraction of the packets are excluded from the Boolean trace according to a thinning mechanism.

20. The apparatus of claim 12 further comprising signaling the updated success ratio in a data plane.

21. The apparatus of claim 20, wherein the updated success ratio is signaled in a one-byte or two-byte real-time transport protocol header extension format.

22. The apparatus of claim 12, further comprising signaling the updated success ratio in a control plane.

* * * * *